Feb. 10, 1970  L. C. AMES  3,495,109
ELECTRIC MOTOR
Filed Sept. 6, 1967  2 Sheets-Sheet 1
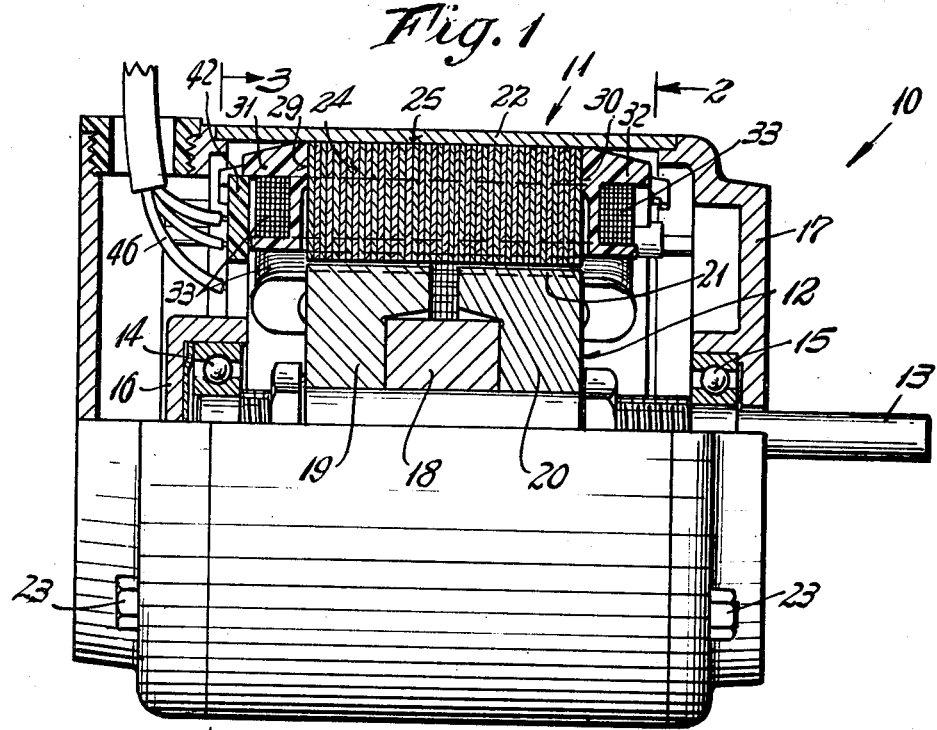
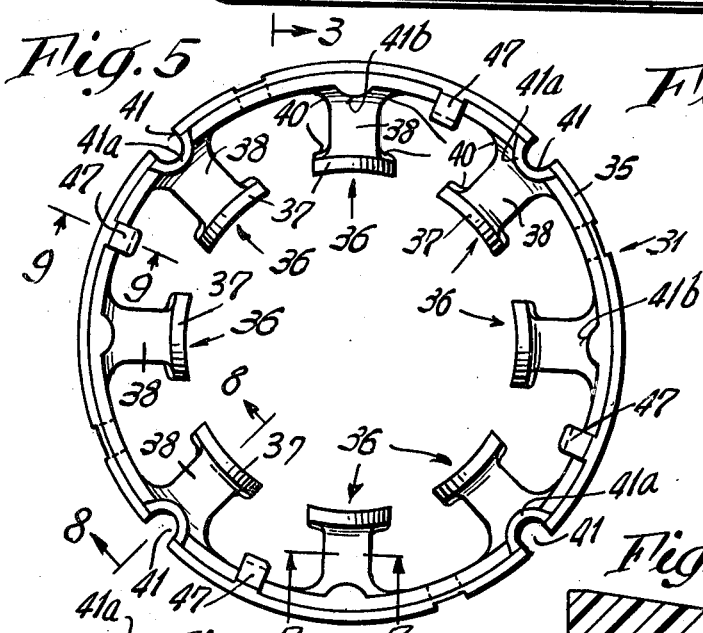
INVENTOR.
Lisle C. Ames
BY
Johnson and Kline
ATTORNEYS Feb. 10, 1970  L. C. AMES  3,495,109
ELECTRIC MOTOR
Filed Sept. 6, 1967  2 Sheets-Sheet 2
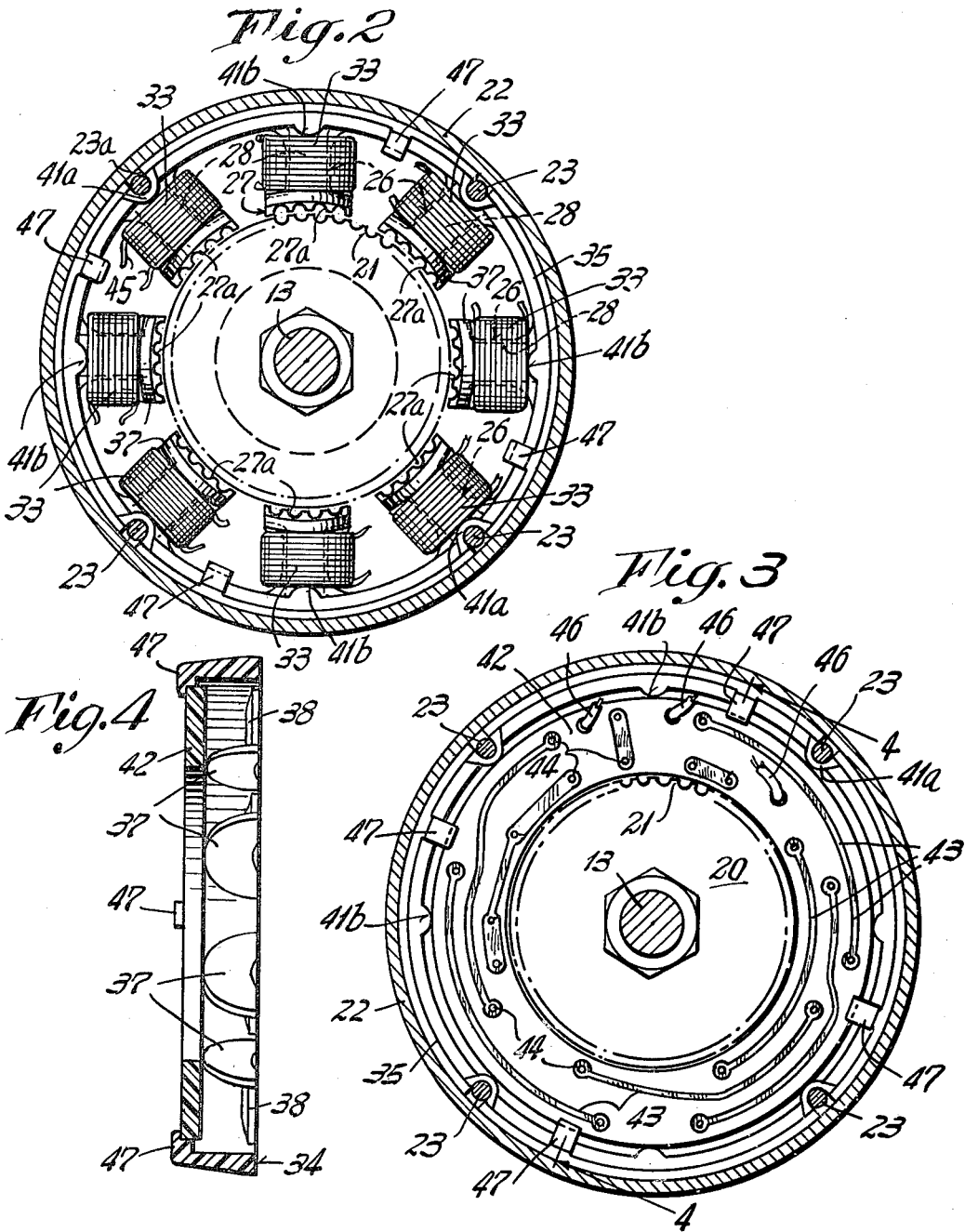
INVENTOR.
Lisle C. Ames
BY
Johnson and Kline
ATTORNEYS

United States Patent Office 3,495,109
Patented Feb. 10, 1970

3,495,109
ELECTRIC MOTOR
Lisle C. Ames, Bristol, Conn., assignor to The Superior Electric Company, Bristol, Conn., a corporation of Connecticut
Filed Sept. 6, 1967, Ser. No. 665,879
Int. Cl. H02k *11/00;* H05k *1/18*
U.S. Cl. 310—71           6 Claims

ABSTRACT OF THE DISCLOSURE

An electric motor of the stepping type having a stator formed with a plurality of elongate radially inwardly projecting poles with a least one winding wound about the intermediate extent of each pole and in which a unitary insulating form is positioned at each end of the stator to serve all the windings as a turn retainer and insulator and as an electrical connector holder.

---

In U.S. Patent Nos. Re. 25,445 and 2,931,929 there is disclosed an electric motor having a stator and a rotor such that excitation of the stator with A.C. or pulsating D.C. produces incrementally rotational steps of the rotor. The stator is formed from a stack of laminations to be axially elongate and to have an outer annular portion from which a plurality of poles extend inwardly. Each pole has a periphery formed with the teeth and a relatively narrow intermediate portion about which a multiturn winding for the pole is wound. The windings are each individually wound on their respective pole with their separate ends being connected to leads which extend exteriorly from the motor for connection to a source of energization. Each winding may be formed of either a single length of wire or two lengths of wire and the interconnections of ends of the lengths of all windings may be made in various ways depending upon the manner in which the windings are to be energized.

Heretofore manufacturing of said motors has been rendered somewhat time consuming and expensive by the necessity of forming each winding individually as a coil and then inserting it into its position about the intermediate portion of its pole with appropriate pieces of sheet insulating material to effect electrical insulation of the winding from the stator stack and also from other parts of the motor. The connection of the winding ends to a common terminal board and the securing of the terminal board to the motor was also rendered time consuming and expensive.

It is accordingly an object of the present invention to provide in a motor of the above type for a stator structure which is extremely economical to fabricate and composed of few inexpensive parts but yet in which electrical insulation of the windings is achieved.

Another object of the present invention is to provide a stator structure in which the windings are wound in place on their respective poles and in which during the winding operation the winding turns are protected and retained in position.

A further object of the present invention is to achieve the above objects by the employment of a pair of unitary, inexpensive pieces with each being positioned at an end of the stator stack and in which each piece is identical and capable of holding a terminal board to which the winding ends are secured.

In carrying out the present invention of an electric motor of the stepping type, the rotor is identical to the rotor disclosed in the above-noted patents. The stator also has an identical stator stack which is composed of secured together laminations formed from paramagnetic thin sheet stampings with each having an identical configuration. The stator stack is axially elongate and formed to provide an outer annular portion with a plurality of equally spaced inwardly projecting poles. The outer end of each pole flares to provide a periphery on which teeth are formed and coiled around the intermediate portion of each pole between the flared end and the exterior annular portion is a winding which by its energization controls the magnetic polarity of the pole. The winding may be coiled in place either manually or automatically from a length of insulated wire if one winding is desired, or two lengths of wire if a two wire winding is desired. The bends in the winding occur at the ends of the stator stack and to retain the bends and protect the wire from the ends of the stack, a unitary piece of electrically insulating material herein called an end form is positioned against each end of the stator stack. The end form has a planar surface which corresponds substantially to the configuration of the stack and thus has a pole portion positioned against each pole. Each pole portion has a somewhat curved intermediate portion and a projecting rib at its inner end and is joined at its outer end to a projecting annular flange. The rib and flange serve to arcuately form the bends of the winding and in addition retain them in position therebetween on the intermediate portion of the poles.

The end form is preferably molded from plastic material that is somewhat flexible and each is formed with a plurality of hooks that are located about the flange and project inwardly. The ends of the winding are secured to a thin annular printed circuit board and the latter is held by the hooks without requiring any additional support.

Other features and advantages will hereinafter appear.
In the drawing:
FIGURE 1 is an elevation of the motor of the present invention shown partly in section.
FIG. 2 is a cross-section taken on the line 2—2 of FIG. 1 showing one end of the stator.
FIG. 3 is a cross-section taken on the line 3—3 of FIG. 1 and showing the other end of the stator.
FIG. 4 is a cross-section of the end form having a connector secured therein.
FIG. 5 is a plan of the stator end form.
FIG. 6 is a side view of the end form.
FIG. 7 is a detail section, somewhat enlarged, taken on the line 7—7 of FIG. 5.
FIG. 8 is a detail section, somewhat enlarged, taken on the line 8—8 of FIG. 5.
FIG. 9 is a detail section, somewhat enlarged, taken on the line 9—9 of FIG. 5.

Referring to the drawing, the electric motor is generally indicated by the reference numeral 10 and includes a stator 11 and a rotor 12. The rotor has a shaft 13 supported in ball bearings 14 and 15 that in turn are mounted in end bells 16 and 17 respectively. The shaft carries a permanent magnet 18 with an end cap 19 and 20 positioned thereagainst with the periphery of each end cap being formed with teeth, generally indicated by the reference numeral 21. The end bells 16 and 17 are supported in spaced apart relation against the ends of a metal tube 22, the latter supporting and forming part of the stator. For clamping the tube and end bells together, four equally spaced bolts and nuts 23 extend therebetween.

Force fitted against the interior of the tube 22 is an elongate stator stack of secured together, thin laminations of paramagnetic material such as sheet steel. The stack 24 includes an outer annular portion 25 and eight poles 26 that project inwardly to provide enlarged peripheries 27 on which teeth 27a are formed. A narrow intermediate portion 28 for each pole bridges the periphery and annular portion 25. Each pole is identical and for a fuller description of the motor structure and operation, reference is made to the above-noted patents.

In accordance with the present invention, the stator stack 24 has planar ends 29 and 30 against which are positioned end forms 31 and 32. At least one winding 33 is wound about the intermediate portion of each pole and end forms to provide for magnetization of the pole. The winding consists of a plurality of turns which may be manually or automatically wound on the intermediate portion from a single length of insulated wire or if two independent windings are desired on a pole, from two lengths of wire.

Referring to FIGS. 5 and 6, each end form 31 and 32 is identical and has a flat or planar inner surface 34 and an outwardly extending annular flange 35 that is somewhat wedge-shaped in cross-section. The forms correspond essentially in shape with the cross-sectional shape of the stator stack 24 and as the latter has eight poles 26, there are also eight equally spaced, inwardly extending projections 36 in the form. Each of the projections 36 extends from the flange 35 and terminates in an enlarged rib 37. Each projection 36 has a narrow intermediate portion 38 between its rib and the flange and as shown in FIG. 7, the portion 38 is convexly curved. At the junction between the intermediate portion 38 and the rib 37 and also the junction of the portion 38 with the flange 35, there are provided fillets 40. While each projection is substantially identical in shape to the corresponding portions of the poles, it will be understood that the fillets 40 cause the end form to be somewhat larger than the underlying pole surfaces.

The rib 37 extends outwardly from the planar end 34 to be higher than the intermediate portion 38 and also the flange 35 extends outwardly so that they form the legs of a U-shaped slot with the intermediate portion 38 constituting the bight thereof.

The shape of each end form 31 and 32 is such as to provide four channels 41 equally spaced in the outer surface of the flange. Each channel is reinforced and defined by a curved rim 41a which increases the width of the flange where the projections are joined thereto. To render each slot identical, the flange at the other projections is also provided with curved rims 41b.

In forming the stator, the stack 24 is initially coated with a thin layer of electrically insulating material, such as thermo-setting epoxy except for the peripheral portions of the poles where the teeth 27 are formed and the outer cylindrical periphery. The stack is then pressed into the tube 22. The end forms 31 and 32 are positioned against the ends of the stack and may be aligned therewith by the use of the channels 41 nad cutouts 23a formed in the periphery of the stack. At least one winding 33 is then wound over each pole with the bend of each turn of the winding being positioned and retained in the U-shaped slot of the projection 36 defined by the rib 37 and flange 35. Also, the curved intermediate portion 38 provides a rounded surface for the turns and prevents sharp bends in the wire. Moreover, the fillets 40 space the edge of the projection somewhat beyond the adjacent pole edges and thus thus prevent possible contact between the wire and pole which not only could effect a short circuit therebetween but which also would be apt to cause breakage of the wire during winding. The width of the intermediate section is at least as wide and preferably slightly wider than the adjacent pole portion width so as to prevent engagement between the wire and the corners of the pole portions.

After the desired number of turns of the winding has been made, all the ends of the wire are brought out one end of the stator to be connected to a printed circuit board 42. The board 42 is flat and annular and is provided with conducting segments 43 which are in communication with apertures 44. Each end 45 of a winding is placed in an aperture specifically designated for it and soldered to its segment. Additionally, external leads 46 are positioned in other apertures and secured both mechanically and electrically to the segments of the board 42. The segments connect the various windings in the manner required for a specific type of energization and it will be understood that if a different manner of connection is desired that a different circuit board, having different conducting segments will be employed.

Each end form 31 and 32 has four equally spaced hooks 47 extending outwardly from the flange 35. The board 42 is held in position in the disclosed embodiment by the form 31 by the spreading of the hooks, the positioning of the board against the outermost surface of the ribs 37 and then the natural returning of the hooks to their shown position. After the ends of the wires have been inserted in the aperture 44 and the board 42 retained by the hooks 47, the ends may then be easily shortened and secured to the board.

With the stator thus formed the rotor and end bells are secured thereto by the use of the bolts and nuts 23. These bolts pass through the stator and are insulated from the windings by the rims 41a.

It will accordingly be appreciated that there has been disclosed an electric motor having a stator that is extremely economical to manufacture and composed of few parts. The stator includes a stack of laminations formed to provide poles and at each end surface of the stack, an identical end form is positioned. The end form consists of a unitary piece of plastic material that is capable of being economically molded. In use it functions to prevent sharp bends in the windings wound on each pole, serves to retain the winding turns in position on the winding while also electrically insulating the turns from the stack, provides an electrical insulation for bolts which pass through the stator and functions as a holder for a printed circuit board to which the windings and external motor leads are connected.

Variations and modifications may be made within the scope of the claims and portions of the improvement may be used without others.

I claim:

1. An electric motor comprising a rotor and a stator, said stator including a stator stack that is axially elongated with an outer annular portion and a plurality of inwardly extending poles with each pole having an intermediate narrow section and a flared end section, the ends of said stack being planar and similar, a unitary end form made of electrically insulating material having a shape substntially corresponding to the end of the stack being positioned against each end of the stack, said form including an outer flange and pole portions, each pole portion being positioned against a stack pole and including an outwardly extending rib and narrow intermediate section to define with the outer flange a U-shaped slot, a plurality of windings, there being one for each pole with each of said windings being wound about the narrow section of each form and into and over the U-shaped slot in the end form at each end of the stack and in which each winding has ends, the motor includes external leads, a unitary printed circuit board means interconnecting the winding ends and the external leads and means on said form for holding the printed circuit board means.

2. The invention as defined in claim 1 in which the last-named holding means includes a plurality of inwardly extending hooks integrally formed on the flange, said hooks being adapted to overlie the printed circuit board means.

3. The invention as defined in claim 1 in which the printed circuit board means includes a flat annular member and the holding means includes integrally formed hooks, said member being positioned on the end form to have its inner surface abut the ribs of the pole positions and its outer surface underlying the hooks.

4. The invention as defined in claim 1 in which the intermediate section of the pole portion is transversely curved to form a rounded surface over which the winding is bent and is wider than the underlying intermediate narrow section of the pole.

5. The invention as defined in claim 1 in which the pole portions of the end forms include fillets at the junction of the intermediate portions and the rib, said fillets extending beyond the adjacent part of the pole sections to be slightly wider than the adjacent part of the pole sections.

6. The invention as defined in claim 5 in which there are additional fillets between the junction of the intermediate portions and the flange, said fillets extending beyond the adjacent part of the pole sections to be slightly wider than the adjacent part of the pole sections.

References Cited

UNITED STATES PATENTS

| | | | |
|---|---|---|---|
| 3,336,490 | 8/1967 | Yelpo | 310—71 X |
| 3,200,275 | 8/1965 | Lindgren | 310—258 X |
| 3,002,119 | 9/1961 | Lindstrom | 310—260 |
| 2,982,872 | 5/1961 | Fredricksön | 310—163 |
| 2,942,125 | 6/1960 | Schaefer | 310—71 |
| 2,931,929 | 4/1960 | Snowdon et al. | 310—44 |
| 2,922,054 | 1/1960 | Miller | 310—71 |
| 2,722,645 | 11/1955 | Brown | 310—71 X |
| 2,688,103 | 8/1954 | Sheldon | 310—71 X |
| 2,653,257 | 9/1953 | Sailer. | |
| 2,629,061 | 2/1953 | Swarthout. | |

MILTON O. HIRSHFIELD, Primary Examiner

MARK O. BUDD, Assistant Examiner

U.S. Cl. X.R.

310—260